United States Patent
Abrand et al.

(10) Patent No.: US 8,226,742 B2
(45) Date of Patent: Jul. 24, 2012

(54) LIQUID/GAS SEPARATION DEVICE AND LIQUID/GAS SEPARATION METHOD, IN PARTICULAR FOR CRUDE OIL LIQUID AND GASEOUS PHASES

(75) Inventors: Stéphanie Abrand, Versailles (FR);
Marc Bonnissel, Ceyreste (FR);
Roberto Di Silvestro, Macherio (IT);
Raymond Hallot, Martigues (FR)

(73) Assignee: Saipem S.A., Montigny le Bretonneux (FR)

( * ) Notice: Subject to any disclaimer, the term of this patent is extended or adjusted under 35 U.S.C. 154(b) by 281 days.

(21) Appl. No.: 12/596,210

(22) PCT Filed: Apr. 21, 2008

(86) PCT No.: PCT/FR2008/050713
§ 371 (c)(1),
(2), (4) Date: Jan. 7, 2010

(87) PCT Pub. No.: WO2008/142344
PCT Pub. Date: Nov. 27, 2008

(65) Prior Publication Data
US 2010/0116128 A1    May 13, 2010

(30) Foreign Application Priority Data
Apr. 26, 2007   (FR) ...................... 07 54714

(51) Int. Cl.
*B01D 19/00* (2006.01)
(52) U.S. Cl. ............... 95/24; 96/209; 96/157; 96/195; 95/261; 95/249; 166/357
(58) Field of Classification Search ........... 95/261, 95/249, 24; 96/209, 210, 211, 212, 157, 96/195; 166/357
See application file for complete search history.

(56) References Cited

U.S. PATENT DOCUMENTS

| 4,506,735 | A | * | 3/1985 | Chaudot | 166/357 |
| 4,527,632 | A | * | 7/1985 | Chaudot | 166/357 |
| 4,793,418 | A |   | 12/1988 | Wheeler et al. | |
| 7,569,097 | B2 | * | 8/2009 | Campen et al. | 95/243 |

FOREIGN PATENT DOCUMENTS

| EP | 0096636 | | 12/1983 |
| FR | 2528106 | | 12/1983 |
| GB | 2101496 | | 1/1983 |
| GB | 2101496 | A * | 1/1983 |

OTHER PUBLICATIONS

English Translation of the Written Opinion of the International Searching Authority dated Nov. 3, 2009.

* cited by examiner

*Primary Examiner* — Duane Smith
*Assistant Examiner* — Douglas Theisen
(74) *Attorney, Agent, or Firm* — Cozen O'Connor

(57) ABSTRACT

A liquid/gas separator device for separating the liquid and gaseous phases of a fluid, the device having first and second vertically-disposed elongate reservoirs. The first reservoir has a first bottom orifice connected to an arrival pipe for the fluid that includes a pressure-lowering device, at least one first top orifice, and a plurality of first intermediate orifices. The first reservoir is connected to a plurality of second reservoirs via a plurality of first transfer pipes, and via at least one second transfer pipe. Each of second reservoirs has a second top orifice connected to a common gas discharge pipe, and a second bottom orifice connected to a common degassed fluid discharge pipe.

26 Claims, 4 Drawing Sheets

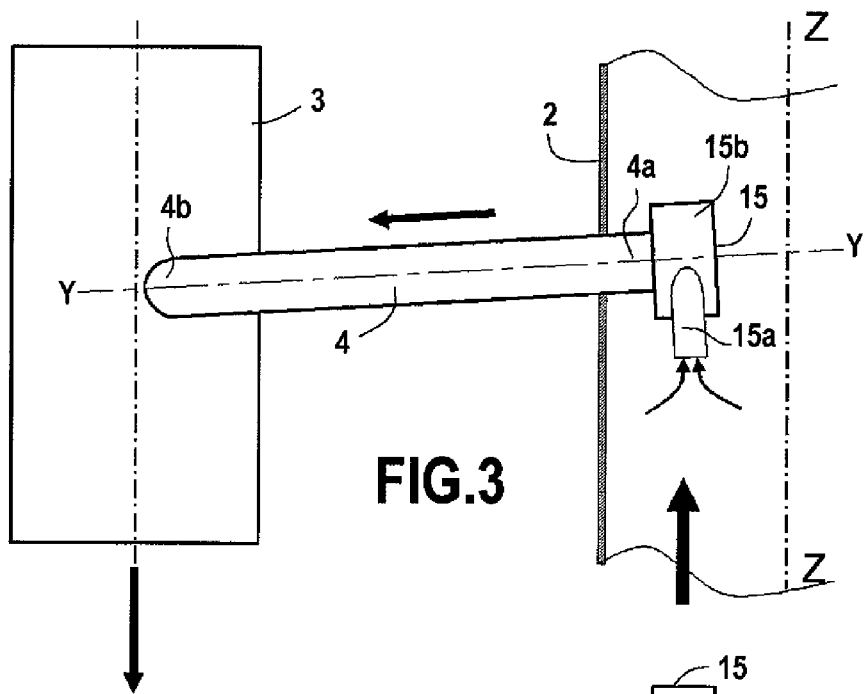
FIG.3
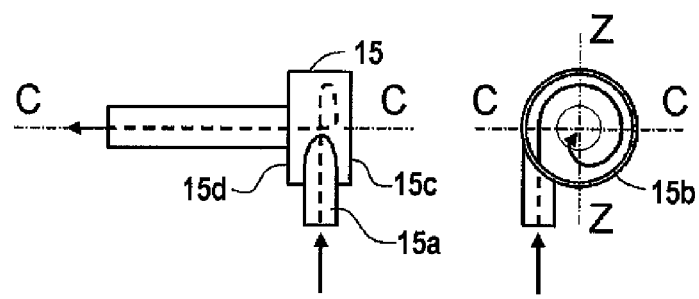 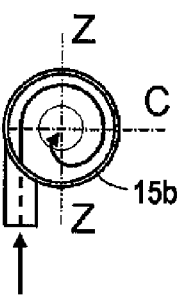
FIG.3A    FIG.3B
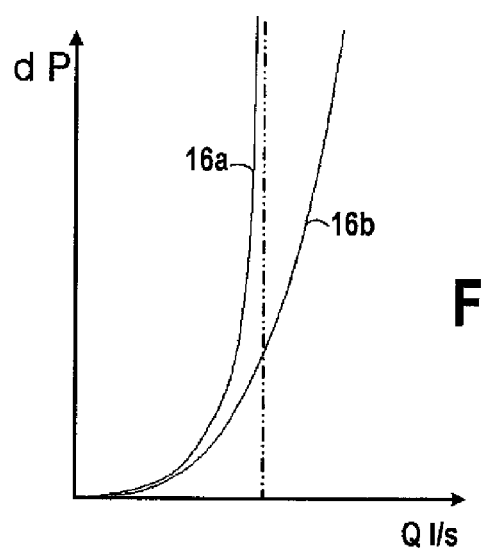
FIG.3C

US 8,226,742 B2

LIQUID/GAS SEPARATION DEVICE AND LIQUID/GAS SEPARATION METHOD, IN PARTICULAR FOR CRUDE OIL LIQUID AND GASEOUS PHASES

PRIORITY CLAIM

This is a U.S. national stage of application No. PCT/FR2008/050713, filed on Apr. 21, 2008. Priority is claimed on the following application: France Application No. 0754714, Filed Apr. 26, 2007, the content of which is incorporated here by reference.

FIELD OF THE INVENTION

The present invention relates to a vertical type liquid/gas separator and to a poly-phase fluid separation method, in particular for separating oil-water and gas as contained in crude oil.

The technical field of the invention is more particularly the field of oil production, and more particularly the field of off-shore oil wells at great depth.

BACKGROUND OF THE INVENTION

In general, oil is produced in deep sea water from a floating support that is anchored close to oil wells situated at the sea bottom, i.e. at various depths in the range 1000 meters (m) to 2500 m, or even more. The floating support generally includes anchor means to enable it to remain in position in spite of the effects of currents, winds, and swell. It also generally includes means for storing and treating oil, and means for off-loading onto off-loading tankers, which call regularly to take away the production. Such a floating support is commonly referred to as a floating production storage off-loading unit, referred to herein by the abbreviation "FPSO".

Well heads are generally connected to said FPSO by underwater pipes of the steel catenary riser (SCR) type, i.e. suspended pipes that are in a catenary configuration, or else of the hybrid tower type, comprising:
a vertical riser having its bottom end anchored to the sea bottom and connected to a said pipe resting on the sea bottom, and its top end held taut by a submerged float to which it is connected; and
a connection pipe, generally a flexible connection pipe, between the top end of said riser and a floating support on the surface, said flexible connection pipe taking up, where appropriate, under its own weight the shape of a dipping catenary curve, i.e. going down well below the float and subsequently rising up to said floating support.

As a general rule, all of the crude oil production is thus raised to the surface on board the FPSO where it is treated for the purpose of separating the oil proper from water, gas, and sandy components, if any. Once it has been separated, the oil is thus stored on board, the gas is washed and then delivered to the gas turbine for producing the electricity and heat that are needed on board, after which the surplus is reinjected into the reservoir of the oil field so as to put said reservoir back under pressure. After being separated from the suspended sand, the water is finally either discarded to the sea after thorough extraction of any oil particle, or else is likewise reinjected into the reservoir, with it being common practice also to use additional sea water taken from below the surface in order to achieve the flow rate necessary for injecting water into the reservoir. The extracted sand, which is present in small quantities only, is finally washed and then discarded into the sea.

In fixed installations on land, the commonly used method of separating the gas, water, and oil in crude oil consists in using reservoirs of very large volume, generally in the form of elongate cylinders, with the crude oil entering via one end and traveling along the reservoir for a duration of the order of 5 minutes (min) to 10 min, during which the various phases separate naturally by gravity before reaching the second end. The gas is then recovered from the top portion of the reservoir, with the water and the sand being recovered from the bottom, while the oil is recovered from an intermediate portion. Separators of this type exist in a wide variety of forms that generally include additional internal devices such as horizontal, cylindrical, or oblique screens, serving to facilitate separating the phases and to prevent them from remixing at a later stage.

Such separators operate at low pressure, e.g. 3 bars to 10 bars, and sometimes even at lower than atmospheric pressure, in order to optimize degassing of the crude oil. If it is desired to install that type of separator at the sea bottom, then the reservoir must be capable of withstanding implosion under the effect of pressure which is substantially 100 bars, i.e. substantially 10 megapascals (MPa) per 1000 m depth of water. Thus, transposing such a reservoir and using it at great or very great depths would require wall thicknesses of 100 mm to 150 mm in order to withstand implosion, and such pieces of boilerwork would be very difficult and very expensive to make and install on the sea bottom at great depth.

OBJECT AND SUMMARY OF THE INVENTION

An object of the present invention is to provide an improved gas/liquid separator device suitable for being installed on the sea bed to operate at great depth, in particular not less than 1000 m, and that is simpler and less expensive to make, install, and operate on the sea bottom.

To do this, the present invention provides a liquid/gas separator device for separating liquid and gaseous phases of a fluid, in particular liquid and gaseous phases of crude oil, the device comprising at least one vertically-disposed cigar-type first reservoir of elongate shape of circular section with bottom and top ends that are, likewise preferably, in the form of partial spherical caps, wherein:
a) said first reservoir comprises a wall fitted with:
a first bottom orifice at its bottom end, connected to an arrival pipe for said fluid, and including a pressure-lowering device and preferably a fluid flow rate control valve upstream;
at least one first top orifice at its top end; and
a plurality of first intermediate orifices; and
b) said first reservoir is connected to a plurality of second reservoirs by a plurality of first transfer pipes, and to at least one second transfer pipe;
said second reservoirs being likewise vertically-disposed, of cigar type, being elongate in shape and of circular section with bottom and top ends that are, likewise preferably, in the form of partial spherical caps;
c) each of said second reservoirs comprises:
a second top orifice at its top end, connected to a common gas discharge pipe; and
a second intermediate orifice disposed lower than said first intermediate orifice, to which it is connected by an inclined said first transfer pipe, and a second bottom orifice at its bottom end connected to a common degassed fluid discharge pipe including downstream an export pump suitable for drawing off said degassed fluid from the bottom ends of said second reservoirs; and d) said first top orifice of said first reservoir is connected via at least one second transfer pipe to at least one third intermediate orifice in at least one of said second reservoirs, said third intermediate orifice being situated above said second intermediate orifice in the same said second reservoir.

The vertical positioning and the shape of said reservoirs gives them good resistance to the hydrostatic pressure at the bottom of the sea, making it possible to implement reservoir walls that are only 20 mm to 30 mm thick.

It can be understood that the flow of crude oil filling the first reservoir, i.e. rising inside the first reservoir, enables first degassing to take place while it is rising. Thereafter, the partially degassed fluid flows downwards inside the second reservoirs, also enabling additional degassing to take place.

Splitting the fluid stream from the first said reservoir into a plurality of said second reservoirs makes it possible to pour into said second reservoirs the fluid that has already been partially degassed but that still contains some gas in such a manner that it flows at reduced flow rate and speed in said second reservoirs, going down towards their bottom ends, i.e. at a speed that is slower than the filling and rising speed of the fluid in said first reservoir. This serves to allow more time for the residual gas to escape from the partially degassed fluid, and thus favors additional degassing inside said second reservoirs.

The top portion of said first reservoir, above said first intermediate orifices, creates a free volume that is filled with gas and that makes it possible to damp, and thus control, the splashes and projections of fluid that can occur in the event of certain pockets of gas ("slugs") penetrating into the bottom end of said first reservoir and expanding suddenly, thereby violently projecting liquid inside said first reservoir.

The second transfer pipe connected to the top end of the first reservoir, enables the gas to be recovered from the top ends of said second reservoirs, while also making it possible, where necessary, for any liquid that reaches the top end of the first reservoir as a result of said projections due to pockets of gas, to be redirected towards the inside of said second reservoirs and to be subjected to liquid/gas separation therein. Said third intermediate orifice is situated above said second intermediate orifice of the second reservoir, preferably close thereto, so as to avoid interfering with the crude oil that is being degassed, and so as to avoid disturbing the rise of gas within said second reservoir.

In a preferred embodiment, the separator device of the invention includes a monitoring device for monitoring the level of fluid inside a said reservoir, preferably inside a said second reservoir, thereby serving to control a said fluid flow rate control valve upstream from said first bottom orifice of said first reservoir and/or a said degassed fluid export pump downstream from said second bottom orifices of said second reservoirs.

This device for monitoring level may for example be a radar or sonar type probe serving to ensure that the level of fluid inside said first reservoir comes up at least as far as said first intermediate orifices, so that the fluid can then flow inside said second reservoirs, while also ensuring that the level of fluid does not rise above the level of said third intermediate orifice inside said second reservoir in question.

Advantageously, the length L1 of said first reservoir is greater than or equal to 10 times its diameter D1, preferably 15 to 30 times its diameter D1.

This dimensioning ensures that the walls of said reservoir present good resistance to compression at great depth.

More particularly, the square of the diameter of said second reservoirs $(D2)^2$ is greater than or equal to $(1/n) \times (D1)^2$, where n is the number of said second reservoirs and D1 is the diameter of said first reservoir.

This characteristic enables the speed of the particles of partially degassed fluid flowing downwards inside said second reservoirs to be less than or equal to 1/n times the upward flow speed of the filling crude fluid particles of said first reservoir flowing upwards inside the bottom portion of said first reservoir.

Still more particularly, the diameter D2 of said second reservoirs is less than the diameter D1 of said first reservoir, and preferably the length L2 of said second reservoir is less than the length L1 of said first reservoirs.

Advantageously, said first intermediate orifices of said first reservoir are situated respectively at a height H relative to the bottom end of said first reservoir that corresponds to one-fourth to one-half of the total length L1 of said first reservoir, and that is preferably about one-third thereof.

Also preferably, the device of the invention includes, inside said first reservoir and at the ends of said first transfer pipes, devices for controlling the fluid transfer flow rate by head loss, preferably devices of the cyclone type having a tangential inlet substantially parallel to the axial direction of said first reservoir, and having an axial outlet substantially on the axis of said first transfer pipes.

Such control devices enable the flow rate of the partially degassed fluid flowing in said first transfer pipes between said first reservoir and said second reservoir to be controlled.

More particularly, these transfer flow rate control devices operating by head loss serve in practice to attenuate and make uniform the fluid flow rate within said various first pipes and said second reservoirs, in spite of the unstable and disturbing conditions that may result from bubbles or pockets of gas bursting during degassing from said crude fluid inside said first reservoir.

More particularly, the device of the invention comprises a central first reservoir surrounded by a plurality of said second reservoirs, preferably four to 12 of them, disposed vertically and distributed preferably in substantially regular manner circularly around said first reservoir.

Still more particularly, said first transfer pipes between said first reservoir and said second reservoirs extend to the level of said second intermediate orifices in such a manner that the fluid flows initially by penetrating tangentially into the insides of the cylindrical walls of said second reservoirs.

This connection configuration between said first and second reservoirs makes it possible to attenuate any disturbances in the fluid flow rate and to encourage residual gas to separate within said second reservoirs.

In a particular embodiment of the device of the invention, the various said second bottom orifices of said second reservoirs are connected to a bottom first manifold, preferably of toroidal shape, itself connected to a single liquid discharge pipe or to a single second pipe element connected thereto; and the various said second top orifices of said second reservoirs are connected to a common top second manifold, itself connected to a single gas discharge pipe or to a single third pipe element connected thereto.

Still more particularly, the various first and second reservoirs are secured to a support structure including at least one frame disposed beneath said reservoirs and supporting automatic connector portions connected to said first bottom orifice, to said second bottom orifices, and to said second top orifices or to ends of pipe elements that are connected to said first bottom orifice and to said second bottom and top orifices.

In a preferred embodiment, the device of the invention is installed at the sea bottom, said fluid arrival pipe providing a connection between at least one well head and said first bottom orifice of said first reservoir or a single first pipe element connected thereto.

More particularly, said fluid discharge pipe cooperates with a said export pump that is inserted in a second well referred to as a pump well that is formed in the sea bottom beside said suction anchor of said base, said pump well preferably being secured to said suction anchor.

Advantageously, said reservoirs are thermally insulated by a common rigid thermal insulation enclosure that is filled with sea water and that is in communication with the sea via at least one communication orifice, preferably the wall of said enclosure includes syntactic foam or a thermal insulator that is protected by a rigid support of metal or composite material, and more preferably it includes a sea water heater device inside said enclosure, said communication orifice and said heater device being more preferably in the bottom portion of said enclosure.

This embodiment enables the crude oil fluid to be maintained at the high temperature in the range 50° C. to 70° C. at which it leaves the well head, thereby making it easier to raise the fluid to the surface, by preventing paraffins solidifying or gas hydrates forming as a result of the crude oil cooling to below 30° C. to 35° C.

The present invention also provides a method of separating the liquid and gaseous phases of a fluid with the help of a device, wherein the method comprises the following steps:

1) sending crude oil via an arrival pipe to said first bottom orifice of said first reservoir; and 2) allowing the crude oil to rise within said first reservoir and fill it up to said first intermediate orifices, and then flow in at least partially degassed form through said first transfer pipes down towards the second bottom orifices at the bottom ends of said second reservoirs; and 3) recovering from said at least one first top orifice the gas separated from said crude oil within said first reservoir, and where appropriate the only partially degassed liquid oil, that is conveyed by a said second transfer pipe to at least the level of a third intermediate orifice within at least one said second reservoir; and 4) recovering the gas separated from said oil within said second reservoir, via said second top orifices, and then within a said gas discharge pipe; and 5) recovering the substantially degassed fluid or liquid from said second bottom orifices of said second reservoirs, which is conveyed via a said liquid discharge pipe and taken to the surface or delivered to a liquid separator device so as to separate a plurality of liquid phases contained in said degassed fluid, in particular for the purpose of separating the oil and the water from degassed crude oil; and where appropriate a residue of gas still present in the incompletely degassed crude oil.

Advantageously, said crude oil is delivered to the bottom end of the said first reservoir at a reduced pressure P1 that is lower than the static pressure P2 at the sea bottom, preferably such that the pressure difference $\Delta P = P1 - P0$, where P0 is the pressure at the surface, is greater than the head losses in the gas discharge pipes from said second top orifices to the surface. This enables the gas to be raised to the surface without using additional equipment and/or without supplying additional external energy, and in particular without using a compressor.

In a particular implementation, the liquid from the degassed fluid is exported from the sea bottom to the surface with the help of a so-called export pump.

Advantageously, the arrival flow rate of the crude fluid upstream from said first reservoir is controlled by said flow rate control valve, and/or the discharge rate of the degassed fluid downstream from the second reservoirs is controlled by the speed of said export pump as a function of measurements taken by at least one device for monitoring fluid level within at least one said second reservoir.

More particularly, monitoring the level of crude fluid within said second reservoir, preferably by means of a probe, enables an increase or a decrease to be imparted to the flow rate of the crude fluid arriving at the bottom end of the first reservoir by means of said flow rate control valve, and/or enables a decrease or respectively an increase in the speed of the export pump drawing off the degassed fluid from the bottom ends of said second reservoirs to be imparted in the event that the level of fluid detected in said second reservoir is situated below the level of said second intermediate orifices, or respectively above said third intermediate orifice, or, preferably above said second intermediate orifices.

In a particular implementation, said separator device is installed at the sea bottom, at a depth of 100 m to 4000 m, and a pressure P2 is established of 10 bars to 50 bars, and preferably of 20 bars ($20 \times 10^5$ pascals (Pa)) within said first and second reservoirs, by lowering the pressure with the help of a pressure lowering device co-operating with said crude fluid arrival pipe upstream from said first bottom orifice of the first reservoir.

BRIEF DESCRIPTION OF THE DRAWINGS

Other characteristics and advantages of the present invention appear in the light of the following detailed description of embodiments with reference to FIGS. 1 to 4:

FIG. 1A is a section view of the suction anchor on plane AA of FIG. 1;

FIG. 3 is a plan view, partially in section on plane BB of FIG. 2, showing a controlled head loss device;

FIG. 3A is a plan view showing the path taken by fluid within the FIG. 3 controlled head loss device;

FIG. 3B is a side view on YY showing the path taken by the fluid within said FIG. 3 controlled head loss device;

FIG. 3C is a graph showing the respective head losses in a device in the disposition of FIG. 2A and in a FIG. 3 controlled head loss device.

MORE DETAILED DESCRIPTION

Figure 1:
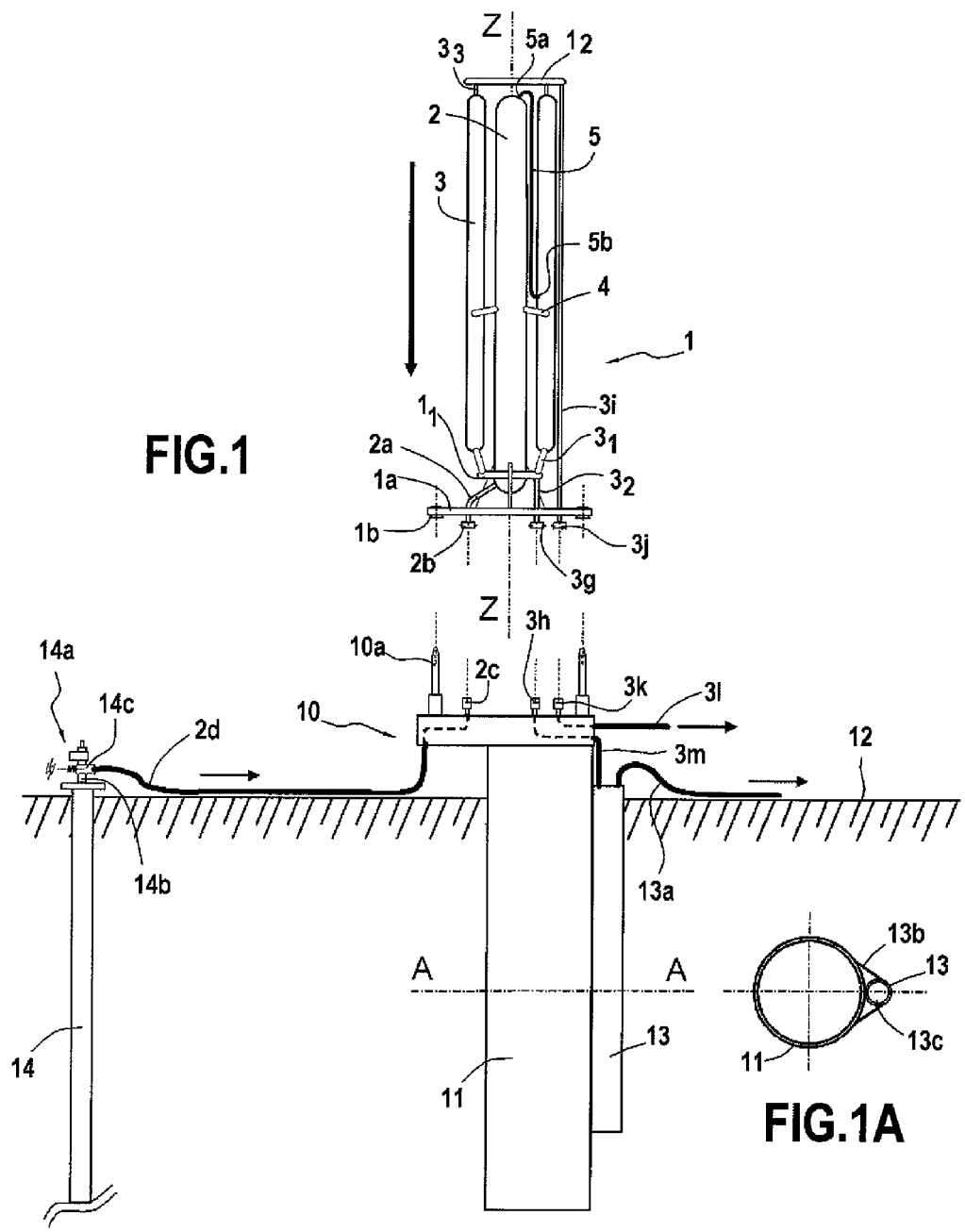
FIG. 1 is a face view of a vertical undersea separator of the invention while it is being lowered towards its base secured to a suction anchor installed on the sea bottom.

FIG. 1 shows an undersea liquid/gas separator device 1 of the invention being lowered from the surface by means of a cable (not shown) towards a base resting on the sea bottom and secured to a suction anchor 11 pushed into the sea bottom 12.

The base is placed close to an oil well 14 fitted with a well head 14a that is connected by a crude oil arrival pipe 2d conveying crude oil from the well head to said base.

The undersea separator of the invention includes a central first reservoir 2 in the form of a cigar, i.e. having a main portion that is cylindrical and of circular section and closed at its ends, preferably by hemispherical caps, so as to withstand well the hydrostatic pressure at the sea bottom, e.g. having a diameter D1 of 0.75 m to 1.50 m, and a height H1 of 10 m to 35 m, being made with metal walls having a thickness of 20 millimeters (mm) to 30 mm.

At a height H above the bottom end of said central first reservoir 2, i.e. up from the bottom thereof, with H corresponding to about 25% to 50% of the total height of said first reservoir, there are intermediate first orifices 4a that are uniformly distributed around the periphery of the first reservoir, and that communicate via first sloping connection pipes 4 with second intermediate orifices 4b in second reservoirs 3.

The second reservoirs are likewise cigar-shaped with a cylindrical main portion closed at each end by hemispherical caps.

Figures 2, 2A:
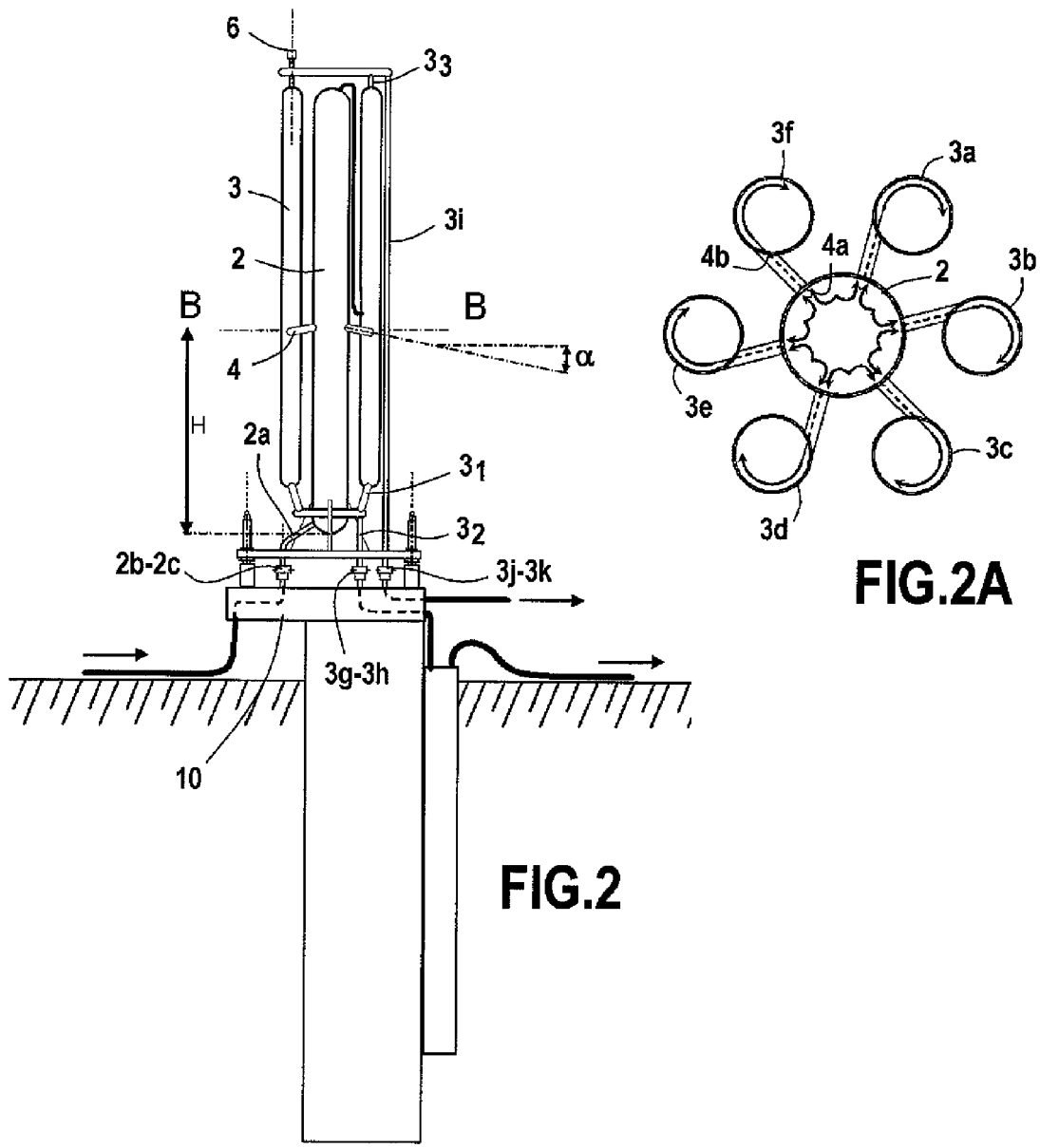
FIG. 2 is a side view of the undersea separator installed on its base.
FIG. 2A is a section view of the undersea separator on plane BB of FIG. 2.

FIG. 2A shows a central first reservoir 2 surrounded by six second reservoirs 3a to 3f that are uniformly distributed and at a constant distance, being disposed vertically and parallel to said first reservoir.

Each of said intermediate orifices 4a of the first reservoir communicates with a respective single one of said second intermediate orifice 4b of said second reservoirs.

Said first connection pipes 4 are all identical in terms of diameter, length, and method of connection between the first reservoir 2 and a respective second reservoir 3a-3f.

The second intermediate orifices 4b of the second reservoirs 3 are located lower down than said first intermediate orifices of the first reservoir, such that said first connection pipes are inclined at an angle α, e.g. lying in the range 5° to 10°.

Beneath said reservoirs, the separator device includes a frame 1a in the form of a platform having four perforations fitted with four funnel-shaped guides 1b that co-operate with corresponding posts 10a that are secured to the base and that project vertically above it, in such a manner that at the end of the device being lowered towards the base, the female portions 2b-3g-3j of a series of automatic connectors situated beneath said frame come into co-operation with the complementary male portions 2c-3h-3k of automatic connectors disposed on said base.

At its bottom end, said first reservoir 2 has a bottom orifice secured to a pipe element 2a having an end at the underface of said frame 1a carrying a female portion 2b of an automatic connector for co-operating with the complementary male portion 2c of the automatic connector on said base, located at the end of said crude fluid arrival pipe 2d.

At the bottom end of each of said second reservoirs 3, second bottom orifices $3_1$ are connected to a first toroidal manifold $1_1$, which is connected via a pipe element $3_2$ that terminates in the female portion 3g of an automatic connector for co-operating with the complementary male portion 3h of the automatic connector secured with said base, which male portion is located at the end of a pipe 3m for discharging the degassed fluid or liquid.

The second reservoirs are a little shorter than the first reservoir, such that the bottom end of said first reservoir passes through said bottom first toroidal manifold $1_1$ so that said first bottom orifice and said first pipe element 2a lie below said first toroidal manifold $1_1$.

The bottom end of the first reservoir 2 and the first toroidal manifold $1_1$ are connected to said frame 1a via a series of gussets, with only one such gusset being shown.

At its top end, said central first reservoir 2 has a first top orifice 5a.

At least one of said reservoirs 3 has a third intermediate orifice 5b situated above said corresponding second intermediate orifice 4b.

Said first reservoir 2 is connected to at least one of said second reservoirs 3a-3f by a second transfer pipe that provides the connection between said first top orifice 5a and said third intermediate orifice 5b.

Each of said second reservoirs 3a-3f includes, at its top end, a second top orifice co-operating with a second pipe element $3_3$ connected to a top second toroidal manifold $1_2$ that is connected to a gas discharge pipe element 3i having its bottom end secured to said base 10 on the underside thereof and compressing the female portion 3j of an automatic connector that co-operates with the complementary male portion 3k of the automatic connector secured to said base 10 when said separator device is fastened on said base.

Said male portion 3k on said base is fastened to the end of a gas discharge pipe 3l.

The top ends of said first and second reservoirs are optionally secured to said top second toroidal manifold $1_2$ by support gussets (not shown).

Nevertheless, in an embodiment, said first transfer pipes 4 and also the pipe elements at the bottom and top ends of said first and second reservoirs, providing the connections with said first and second toroidal manifolds and said frame 1a, are sufficiently rigid to hold the structure together.

Crude oil at high pressure, e.g. lying in the range 100 bars to 200 bars, or even higher, comes from the well 14 that is surmounted by the well head 14a that is fitted with a pressure-dropping device of the choke type 14b and with an automatic valve for controlling flow rate 14c, which device and valve are controlled from the surface and are connected to a pipe 2d conveying crude oil at reduced pressure, e.g. at 20 bars, to the undersea separator 1.

The crude oil penetrates into the bottom portion of the first reservoir 2 and fills it until it reaches the plane BB containing the first intermediate orifices 4a, after which the oil pours into said first transfer pipe 4 leading to the second reservoirs.

While the crude oil is rising in the first reservoir, the oil is at a pressure that is low relative to its pressure on leaving the well, so a degassing stage begins in which bubbles of gas expand rapidly and reach the free surface situated above the plane BB:

oil is then conveyed upwards with a particle velocity $$V2=Q/S2$$

where Q is the flow rate and S2 is the section of said first reservoir 2.

When the crude oil reaches the first transfer pipe 4 leading to the second reservoirs 3, the stream and thus the flow rate is thus substantially divided into as many streams as there are second reservoirs, here being divided by six, as shown in FIG. 2A.

The first transfer pipes 4 are preferably connected radially to said first reservoir, but present an angle of inclination α, e.g. lying in the range 5° to 10°, so that the crude oil flows naturally from the first reservoir towards the second reservoirs, to which the pipes may be connected merely radially, but are advantageously connected tangentially as shown in FIG. 2A.

When connected tangentially, as shown in FIG. 2A, the crude oil enters into a second reservoir with a small amount of swirling effect, and then continues merely under gravity to travel towards the bottom of said second reservoir.

In the second reservoir, the crude oil finishes degassing throughout the time it takes for the particles to move down to the bottom and reach the bottom outlet orifice $3_1$ from said second reservoir, and the bubbles rise towards the surface, passing through the swirling plane of the crude oil at the level of the plane BB.

The downward speed of the particles is then given by $$V3=Q/n/S3$$

where Q is the overall flow rate, n is the number of second reservoirs, and S3 is the section of said second reservoirs 3.

Thus, if the first reservoir and the six second reservoirs all have the same diameter, and thus the same section, the downward speed of the particles is six times slower than in the second reservoirs than the upward speed of the particles in the first reservoir, thereby facilitating and improving the quality of degassing in the second reservoirs.

In the first reservoir, coarse degassing of the largest gas bubbles takes place, whereas in the second reservoirs, final degassing takes place of smaller bubbles of gas.

The first reservoir extends over a long distance above the plane BB so as to damp the phenomena of so-called "slugs", i.e. the sudden arrival of large pockets of gas entering via the bottom pipe 2*a*, or of slugs of oil between two pockets of gas.

These phenomena are very violent and completely disturb the separation process, since a large portion of the crude oil in the region of the plane BB is then projected forcibly towards the top of said first reservoir.

By increasing the length of said first reservoir above the plane BB to a considerable extent, it is possible to minimize the disturbing effects of slugs, and gas separation restabilizes quickly in the plane BB as soon as the flow of crude oil becomes stable again.

In the top portion of the first reservoir, said second transfer pipe 5 recovers the gas and directs it towards at least one of the second reservoirs, preferably at the level of the middle portions of said second reservoirs, above the plane BB, e.g. 2 m above said plane BB.

Thus, the gas separated from the crude oil within the first reservoir is discharged at the top via the pipe and is returned to the second reservoir(s) above the plane BB, and thus in a zone where the gas that escapes from the crude oil penetrating into said second reservoirs is collected. Thus, all of the gas separated in the first reservoir and the second reservoirs is collected in said second reservoirs and is subsequently directed to the top toroidal manifold $1_2$ and then discharged via the gas discharge pipe 31, as explained above.

The second reservoirs are advantageously of a diameter that is similar to, or greater than the diameter of the first reservoir if it is desired to reduce the vertical downward speed of crude oil particles and thus improve the quality of degassing.

Thus, with a viscous crude, the degassing bubbles have difficulty in overcoming the downward flow in the second reservoirs, so it is advantageous to have a larger number of second reservoirs of greater diameter, e.g. eight or 12 second reservoirs having a diameter of 1.25 m in association with a first reservoir having a diameter of 1 m.

There are at least two second reservoirs disposed symmetrically on either side of said first reservoir, and there are preferably 4-6-8-12 or even more, or indeed an odd number of them.

Figure 4:
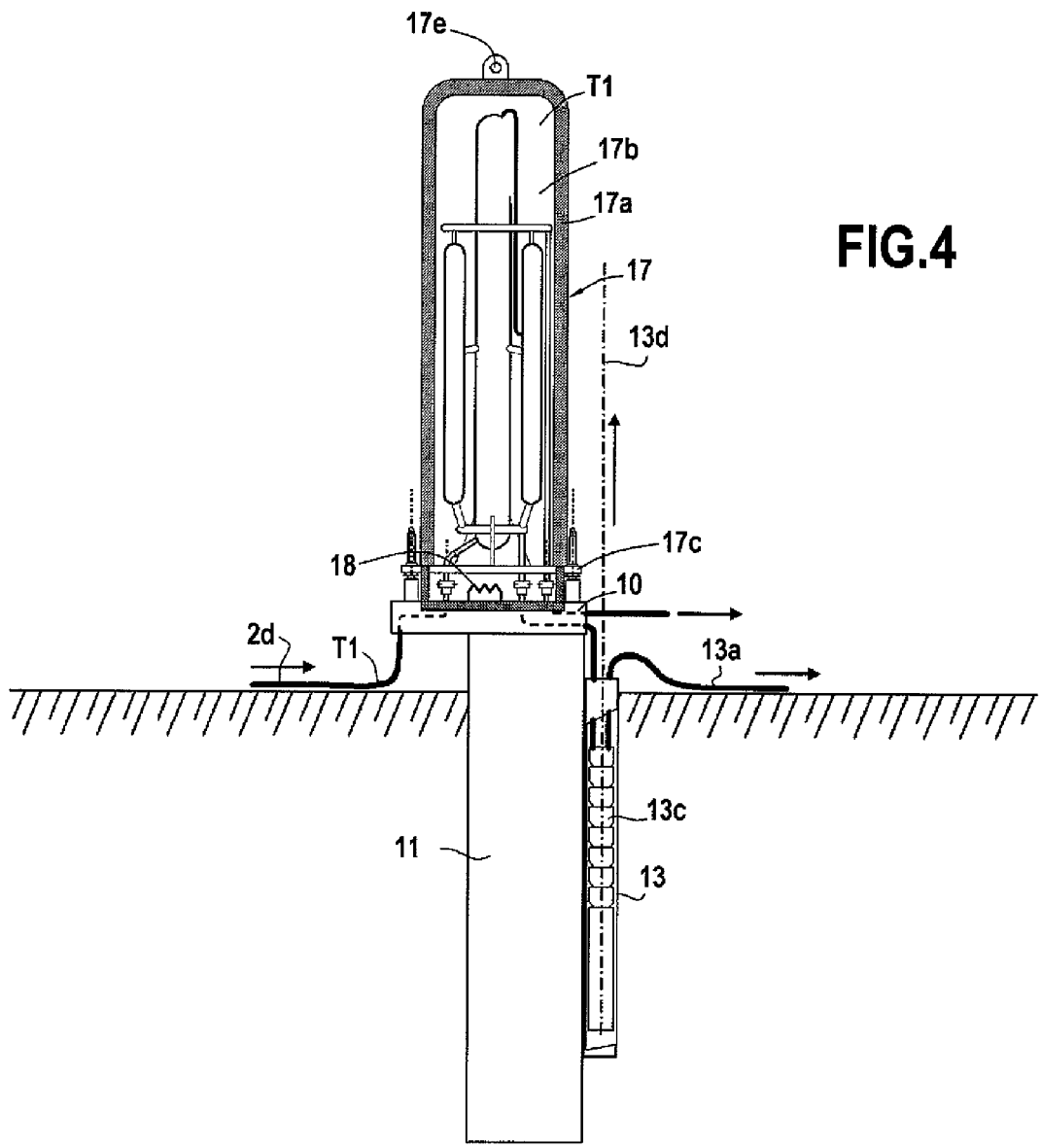
FIG. 4 is a side view of an undersea separator installed on its base, and fitted with an insulating bell.

The height of the second reservoirs may be similar to that of the first reservoir or they may be shorter, as shown in FIG. 4.

The degassed crude oil is recovered from the bottom portions of the second reservoirs via the first manifold $1_1$ directing the fluid towards a first pipe element 3*m* for discharging degassed fluid.

This pipe element feeds an submerged export pump 13*c* shown in FIG. 4, that is housed in a well 13 adjacent to the suction anchor 11 and secured thereto by gussets 13*b* that are shown in FIG. 1A, but not in FIGS. 1-2-4.

At the outlet from the pump, the degassed crude oil is taken via a second pipe element 13*a* for discharging the degassed fluid, either to a floating support on the surface, or to a secondary water-oil separator, so that only the oil is taken to the surface, with the water being reinjected into a well similar to the well 14, or indeed merely released into the sea, providing it is acceptably clean, i.e. providing it has a sufficiently small quantity of residual particles of crude oil.

In the same way, the gas separated in the top portions of the second reservoirs is taken by the gas discharge pipe 31 either to the surface, or else it is recompressed and reinjected into a well similar to the well 14.

The operation of the entire separator device 1 is controlled by means of at least one level-measuring device 6 that is installed at the top of at least one of said second reservoirs, as shown in FIG. 2.

This measurement device or sensor of the radar or sonar type provides information about the level of the separation plane between the crude oil and the gas in said second reservoir and enables the flow rate of crude oil penetrating into the first reservoir to be adjusted by controlling the aperture of the flow rate regulator valve 14*c* of the well head 14*a* and/or the speed of the export pump 13*c*. If the level is above the plane BB, the second reservoir is too full, so the arrival rate of the crude oil is reduced at the valve 14*c* of the well 14, or the rate of pumping is increased.

If the level is lower than the plane BB, then the flow rate at the well head is increased, or the speed of the export pump is decreased. The gas pressure in the pipe 31 leading to the floating support is controlled by adjustment at said floating support.

In order to avoid the need to recompress the gas before sending it to the surface, the operating pressure of the undersea separator, i.e. the pressure P1 inside one of said reservoirs, is advantageously adjusted to a pressure that is well above the head loss in said gas pipe, e.g. an operating pressure of 20 bars, for a head loss of only 3 bars along the entire length of the pipe 31 leading to the surface at the maximum flow rate of the gas.

FIGS. 3-3A-3B are sections and a side view showing a preferred disposition for the first transfer pipe 4 between the first reservoir and one of the second reservoirs, in which said pipe 4 penetrates into said second reservoir and is fitted at its end with an additional device 15 of the cyclone type for the purpose of creating additional head loss in the event of a significant increase in flow rate. For this purpose, the cyclone type device 15 is constituted by an enclosure comprising a cylindrical wall 15*b* that is concentric with the first transfer pipe 4 and of diameter that preferably lies in the range 1.2 to 4 times the diameter of said pipe 4.

The cylindrical wall 15*b* of the enclosure is closed and sealed at its ends by opposite faces 15*c*-15*d*. One of these two faces, the face 15*d* has the end of said first transfer pipe 4 passing therethrough.

The cylindrical wall 15*b* of the device 15 possesses a tubular branch enabling crude oil to enter tangentially at 15*a* against the inside surface of said cylindrical wall 15*b* in a direction that is substantially parallel to the axial direction ZZ of said first reservoir 2.

In normal and regular operation, the flow of crude oil remains substantially on the axial plane CC of the pipe 4 inclined at an angle α relative to the horizontal, and the device 15 does not modify the operation of the system, which presents the same performance as that described above with reference to FIGS. 2-2A.

In the event of a significant increase in flow rate, or of instability of the system on the arrival of a "slug", the flow in the device 15 becomes turbulent as shown in FIG. 3B, thereby creating significant head loss, and as a result reducing the extent to which the temporary instability of the process is transmitted to the second reservoir.

This effect is illustrated in the diagram of FIG. 3C where head loss is plotted up the ordinate and fluid flow rate along the abscissa.

With a direct connection of the pipe 4 to the first reservoir as shown in FIG. 2A, the curve 16b plotting head loss is substantially parabolic, whereas with the device 15, the corresponding curve 16a is substantially parabolic at no head losses, but increases asymptotically at high flow rates.

Since the device is installed at great depth, the temperature of the sea water is 3°-5° C., and in order to prevent the crude oil from freezing into paraffin, or to prevent hydrates from forming and thus creating generalized blockages that are difficult, and sometimes even impossible, to absorb, it is desirable to insulate each of the elements between the sea bottom exit from the well 14 and the surface or the reinjection wells.

For this purpose, it is advantageous to install an insulating enclosure 17 that completely surrounds the reservoirs and the base 10 of the undersea separator, the enclosure 17 being stiffened, e.g. by a metal or a composite structure, and including internal insulation 17a that may be constituted by syntactic foam, an insulating gel, or any other system of insulation that is compatible with pressure at the sea bottom, which is substantially 100 bars, i.e. substantially 10 MPa per 1000 m of depth of water.

Each of the components of the undersea separator could be insulated separately, i.e. the first reservoir can be separated separately from the second reservoirs and the various pipes, however, since the high portion above the plane BB is generally filled with gaseous phase only, that would lead to a significant increase in the risk of cold points occurring therein. By creating an internal volume 17b that is lagged at 17a, the sea water contained in said volume will be permanently at substantially the same temperature T1 as the crude oil entering via 2d. An internal convection current within the volume 17b will continually stir said volume, thereby maintaining a substantially constant temperature within the undersea separator throughout the duration of the process, and more particularly within the high portion of said separator that is filled with gas on an almost permanent basis, and even though the height of the separator may exceed 35 m.

In order to limit head transfers in the bottom portion, it is advantageous to place additional insulation 17c around the base 10.

A bottom orifice of the enclosure 17 (not shown) advantageously puts the inside volume 17b into communication with the surrounding medium so as to avoid pressure variations due to expansion, however the orifice should be of small diameter, e.g. 50 mm, in order to avoid undesirable convection phenomena.

As shown in FIG. 4, a water preheater/reheater device 18 is advantageously placed at the bottom portion of the insulating enclosure 17 and within it, thereby enabling the volume of sea water therein to be maintained at a temperature that is high enough to avoid plugs of paraffin or of hydrates forming during a starting stage, a prolonged stoppage, or production at a low rate. The heater device may be electric, or it may be constituted by a loop of circulating fluid, e.g. taken from the production crude oil and passing through a non-lagged coil inside the volume of water inside the lagged enclosure.

The insulating enclosure is advantageously manipulated via a top attachment point 17e from the surface or by means of an automatic submarine remotely-operated vehicle (ROV) that is controlled from the surface.

FIG. 4 also shows the export pump 13c installed in its well 13 and that is advantageously suitable for being extracted vertically along 13d for maintenance on the surface, without it being necessary to dismantle the undersea separator.

Since the pump well 13 is secured to the suction anchor, it is thus installed at the same time as said suction anchor 11 and in a known geometrical position relative to the base 10 for supporting the undersea separator 1.

This particular arrangement of the pump 13c installed at several meters or even several tens of meters below the separator makes it advantageously possible to improve the boosting of said pump 13c and thus to make its operation and lifetime more reliable.

By way of example, a vertical separator of the invention presents a separation capacity of 500 cubic meters per hour ($m^3$/h) of crude oil with a gas oil ratio (GOR) of 100, i.e. 100 normalized cubic meters ($Nm^3$) of gas (i.e. cubic meters of gas at atmospheric pressure) per cubic meter of crude oil. It is constituted by a first reservoir of height L1=25 m and of diameter D1=1 m, the orifices 4a of the first connection pipe being situated at 8 m from the bottom. The second reservoirs are six in number, of diameter D2=1.2 m, of height L2=16 m, and the orifices 4b of the first connection pipes are situated at 7 m from the bottom. The flow rate of 500 $m^3$/h, i.e. 138.9 liters per second (l/s) represents an upward speed for particles in the first reservoir of 17.68 centimeters per second (cm/s), which corresponds to separation within said first reservoir having a duration of 45.2 seconds (s), i.e. 0.75 min. The downward speed of particles within said second reservoirs is then 2.05 cm/s, which corresponds to separation within said second reservoirs having a duration of 342 s, i.e. 5.7 min. The total duration of separation is thus 6.45 min, with 88.3% of the separation duration taking place in said second reservoirs under optimized operating conditions that enable 90% to 95% of the gas contained in the crude oil to be extracted.

The invention claimed is:

1. A liquid/gas separator device for separating liquid and gaseous phases of a fluid, the device comprising at least one vertically-disposed first reservoir of elongate shape of circular section, wherein:
   a) said first reservoir comprises a wall fitted with:
      a first bottom orifice at its bottom end, connected to an arrival pipe for said fluid, and including a pressure-lowering device;
      at least one first top orifice at its top end; and
      a plurality of first intermediate orifices; and
   b) said first reservoir is connected to a plurality of second reservoirs by a plurality of first transfer pipes, and to at least one second transfer pipe;
      said second reservoirs being likewise vertically-disposed, being elongate in shape and of circular section;
   c) each of said second reservoirs comprises:
      a second top orifice at its top end, connected to a common gas discharge pipe; and a second intermediate orifice disposed lower than said first intermediate orifice, to which it is connected by an inclined said first transfer pipe, and a second bottom orifice at its bottom end connected to a common degassed fluid discharge pipe including downstream an export pump suitable for drawing off said degassed fluid from the bottom ends of said second reservoirs; and
   d) said first top orifice of said first reservoir is connected via at least one second transfer pipe to at least one third intermediate orifice in at least one of said second reservoirs, said third intermediate orifice being situated above said second intermediate orifice in the same said second reservoir.

2. The device according to claim 1, further comprising a monitoring device for monitoring the level of fluid inside said reservoir, thereby serving to control said fluid flow rate control valve upstream from said first bottom orifice of said first reservoir or said degassed fluid export pump downstream from said second bottom orifices of said second reservoirs.

3. The device according to claim 1, wherein the length L1 of said first reservoir is greater than or equal to 10 times its diameter D1.

4. The device according to claim 1, wherein the square of the diameter of said second reservoirs $(D2)^2$ is greater than or equal to $(1/n) \times (D1)^2$, where n is the number of said second reservoirs and D1 is the diameter of said first reservoir.

5. The device according to claim 1, wherein the diameter of said second reservoirs is less than the diameter of said first reservoir.

6. The device according to claim 1, wherein said first intermediate orifices of said first reservoir are situated respectively at a height H relative to the bottom end of said first reservoir that corresponds to one-fourth to one-half of the total length L1 of said first reservoir.

7. The device according to claim 1, further comprising inside said first reservoir and at the ends of said first transfer pipes, devices for controlling the fluid transfer flow rate by head loss.

8. The device according to claim 1, further comprising a central first reservoir surrounded by a plurality of said second reservoirs disposed vertically and distributed around said first reservoir.

9. The device according to claim 1, wherein said first transfer pipes between said first reservoir and said second reservoirs extend to the level of said second intermediate orifices in such a manner that the fluid flows initially by penetrating tangentially into the insides of the cylindrical walls of said second reservoirs.

10. The device according to claim 1, wherein:
the various said second bottom orifices of said second reservoirs are connected to a bottom first manifold, itself connected to a single liquid discharge pipe or to a single second pipe element connected thereto; and
the various said second top orifices of said second reservoirs are connected to a common top second manifold, itself connected to a single gas discharge pipe or to a single third pipe element connected thereto.

11. The device according to claim 1, wherein the various first and second reservoirs are secured to a support structure including at least one frame disposed beneath said reservoirs and supporting automatic connector portions connected to said first bottom orifice, to said second bottom orifices, and to said second top orifices or to ends of pipe elements that are connected to said first bottom orifice and to said second bottom and top orifices.

12. The device according to claim 1, wherein the device is installed at the sea bottom, said fluid arrival pipe providing a connection between at least one well head and said first bottom orifice of said first reservoir or a single first pipe element connected thereto.

13. The device according to claim 12, wherein said liquid/gas separator device is connected to a base resting on the sea bottom, said base supporting a series of male or female automatic connector portions located respectively at the ends of said fluid arrival pipe, degassed liquid discharge pipe, and gas discharge pipe, co-operating with complementary female or male automatic connector portions connected to said first and second bottom orifices and to said second top orifices or to the ends of said first, second, and third pipe elements providing connections with said first bottom orifice, second bottom orifices, and said second top orifices, respectively.

14. The device according to claim 12 wherein said fluid discharge pipe co-operates with said export pump inserted in a second well formed in the sea bottom beside said suction anchor of said base.

15. The device according to claim 12, wherein said reservoirs are thermally insulated by a common rigid thermally insulating enclosure filled with sea water and in communication with the sea via at least one communication orifice.

16. A method of separating the liquid and gaseous phases of a fluid with the help of a liquid/gas separator device, the device comprising at least one vertically-disposed first reservoir of elongate shape of circular section, wherein: (a) said first reservoir comprises a wall fitted with: a first bottom orifice at its bottom end, connected to an arrival pipe for said fluid, and including a pressure-lowering device; at least one first top orifice at its top end; and a plurality of first intermediate orifices; and (b) said first reservoir is connected to a plurality of second reservoirs by a plurality of first transfer pipes, and to at least one second transfer pipe; said second reservoirs being likewise vertically-disposed, being elongate in shape and of circular section; (c) each of said second reservoirs comprises: a second top orifice at its top end, connected to a common gas discharge pipe; and a second intermediate orifice disposed lower than said first intermediate orifice, to which it is connected by an inclined said first transfer pipe, and a second bottom orifice at its bottom end connected to a common degassed fluid discharge pipe including downstream an export pump suitable for drawing off said degassed fluid from the bottom ends of said second reservoirs; and (d) said first top orifice of said first reservoir is connected via at least one second transfer pipe to at least one third intermediate orifice in at least one of said second reservoirs, said third intermediate orifice being situated above said second intermediate orifice in the same said second reservoir, the method comprising:
1) sending crude oil via an arrival pipe to said first bottom orifice of said first reservoir; and
2) allowing the crude oil to rise within said first reservoir and fill up said first reservoir to said first intermediate orifices, and then flow in at least partially degassed form through said first transfer pipes down towards the second bottom orifices at the bottom ends of said second reservoirs; and
3) recovering from said at least one first top orifice the gas separated from said crude oil within said first reservoir that is conveyed by said second transfer pipe to at least the level of a third intermediate orifice within at least one said second reservoir; and
4) recovering the gas separated from said oil within said second reservoir, via said second top orifices, and then within said gas discharge pipe; and 5) recovering the substantially degassed fluid or liquid from said second bottom orifices of said second reservoirs, which is conveyed via said liquid discharge pipe and taken to the surface or delivered to a liquid separator device so as to separate a plurality of liquid phases contained in said degassed fluid.

17. The method according to claim 16, wherein said crude oil is delivered to the bottom end of the said first reservoir at a reduced pressure P1 that is lower than the static pressure P2 at the sea bottom.

18. The method according to claim 16 wherein the liquid from the degassed fluid is exported from the sea bottom to the surface with the help of said export pump.

19. The method according to claim 16, wherein the arrival flow rate of the crude fluid upstream from said first reservoir is controlled by said flow rate control valve, or the discharge rate of the degassed fluid downstream from the second reservoirs is controlled by the speed of said export pump as a function of measurements taken by at least one device for monitoring fluid level within at least one said second reservoir.

20. The method according to claim 19, wherein the monitoring the level of crude fluid within said second reservoir enables an increase or a decrease to be imparted to the flow rate of the crude fluid arriving at the bottom end of the first reservoir by means of said flow rate control valve, or enables a decrease or respectively an increase in the speed of the export pump drawing off the degassed fluid from the bottom ends of said second reservoirs to be imparted in the event that the level of fluid detected in said second reservoir is situated below the level of said second intermediate orifices, or respectively above said third intermediate orifice.

21. The method according to claim 16, wherein said separator device is installed at the sea bottom, at a depth of 100 m to 4000 m, and a pressure P2 is established of 10 bars to 50 bars, within said first and second reservoirs, by lowering the pressure with the help of a pressure lowering device co-operating with said crude fluid arrival pipe upstream from said first bottom orifice of the first reservoir.

22. The device according to claim 1, further comprising a monitoring device for monitoring the level of fluid inside said reservoir, thereby serving to control said fluid flow rate control valve upstream from said first bottom orifice of said first reservoir and said degassed fluid export pump downstream from said second bottom orifices of said second reservoirs.

23. The method according to claim 16, wherein the arrival flow rate of the crude fluid upstream from said first reservoir is controlled by said flow rate control valve, and the discharge rate of the degassed fluid downstream from the second reservoirs is controlled by the speed of said export pump as a function of measurements taken by at least one device for monitoring fluid level within at least one said second reservoir.

24. The method according to claim 23, wherein the monitoring the level of crude fluid within said second reservoir enables an increase or a decrease to be imparted to the flow rate of the crude fluid arriving at the bottom end of the first reservoir by means of said flow rate control valve, and enables a decrease or respectively an increase in the speed of the export pump drawing off the degassed fluid from the bottom ends of said second reservoirs to be imparted in the event that the level of fluid detected in said second reservoir is situated below the level of said second intermediate orifices, or respectively above said third intermediate orifice.

25. The device according to claim 1, wherein said first reservoir comprises bottom and top ends that are in the form of partial spherical caps.

26. The device according to claim 1, wherein said second reservoirs each comprise bottom and top ends that are in the form of partial spherical caps.

* * * * *